US011321285B2

(12) United States Patent
Krishnamoorthy et al.

(10) Patent No.: US 11,321,285 B2
(45) Date of Patent: May 3, 2022

(54) AUTOMATIC DATABASE SCRIPT GENERATION FOR COPYING DATA BETWEEN RELATIONAL DATABASES

(71) Applicant: BANK OF AMERICA CORPORATION, Charlotte, NC (US)

(72) Inventors: Madhusudhanan Krishnamoorthy, Chennai (IN); Manikandan Madhu, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 100 days.

(21) Appl. No.: 17/060,282

(22) Filed: Oct. 1, 2020

(65) Prior Publication Data
US 2022/0107922 A1 Apr. 7, 2022

(51) Int. Cl.
*G06F 16/21* (2019.01)
*G06F 16/22* (2019.01)
*G06N 20/00* (2019.01)

(52) U.S. Cl.
CPC .......... *G06F 16/212* (2019.01); *G06F 16/214* (2019.01); *G06F 16/221* (2019.01); *G06F 16/2282* (2019.01); *G06N 20/00* (2019.01)

(58) Field of Classification Search
CPC .. G06F 16/212; G06F 16/221; G06F 16/2282; G06F 16/214
See application file for complete search history.

(56) References Cited

U.S. PATENT DOCUMENTS

| | | | |
|---|---|---|---|
| 5,758,337 A | 5/1998 | Hammond | |
| 5,758,355 A | 5/1998 | Buchanan | |
| 5,819,251 A | 10/1998 | Kremer et al. | |
| 5,870,759 A | 2/1999 | Bauer et al. | |
| 5,870,765 A | 2/1999 | Bauer et al. | |
| 5,884,325 A | 3/1999 | Bauer et al. | |
| 5,926,816 A | 7/1999 | Bauer et al. | |
| 6,714,943 B1 | 3/2004 | Ganesh et al. | |

(Continued)

OTHER PUBLICATIONS

Bogin, et al.; Representing Schema Structure with Graph Neural Networks for Text-to-SQL Parsing; Cornell University; arXiv:1905.06241 [cs.CL]; submitted on May 15, 2019 (v1), last revised Jun. 3, 2019 (v2).

*Primary Examiner* — James Trujillo
*Assistant Examiner* — Michal Bogacki

(57) ABSTRACT

An apparatus includes a memory and processor. The memory stores a graphical representation of a first database that includes source tables and columns. The graphical representation includes nodes associated with source tables and columns. The processor receives an instruction to transfer data from the first database to columns of a second database specified by destination column names. The processor identifies a subset of source columns such that a similarity score for each is greater than a threshold. The similarity score indicates a degree of similarity between a specific destination column name and either the assigned source column name or a related term. The processor uses the subset to generate a pruned graphical representation that includes a subset of nodes. The processor uses this to generate executable code configured to copy data from the first database, determined from the pruned graphical representation, into the second database.

20 Claims, 9 Drawing Sheets

(56) References Cited

U.S. PATENT DOCUMENTS

| | | |
|---|---|---|
| 6,728,719 B1 | 4/2004 | Ganesh et al. |
| 6,792,436 B1 | 9/2004 | Zhu et al. |
| 6,931,390 B1 | 8/2005 | Zait et al. |
| 6,950,834 B2 | 9/2005 | Huras et al. |
| 6,965,899 B1 | 11/2005 | Subramaniam et al. |
| 6,983,293 B2 | 1/2006 | Wang |
| 7,031,956 B1 | 4/2006 | Lee et al. |
| 7,415,487 B2 | 8/2008 | Bell et al. |
| 7,711,703 B2 | 5/2010 | Smolen et al. |
| 8,051,102 B2 | 11/2011 | Everett |
| 8,321,478 B2 | 11/2012 | Fong |
| 8,788,457 B2 | 7/2014 | Parees et al. |
| 8,935,277 B2 | 1/2015 | Kuchmann-Beauger et al. |
| 8,943,041 B2 | 1/2015 | Simon et al. |
| 8,996,555 B2 | 3/2015 | Kuchmann-Beauger et al. |
| 9,244,952 B2 | 1/2016 | Ganti et al. |
| 9,311,349 B2 | 4/2016 | Hermstadt |
| 9,442,994 B2 | 9/2016 | Carvalho et al. |
| 9,589,041 B2 | 3/2017 | Tran et al. |
| 9,727,608 B2 | 8/2017 | Cheng et al. |
| 10,078,682 B2 | 9/2018 | Tan et al. |
| 10,162,851 B2 | 12/2018 | Eidson et al. |
| 10,268,742 B2 | 4/2019 | Adya et al. |
| 10,275,540 B2 | 4/2019 | Britton et al. |
| 2005/0278458 A1 | 12/2005 | Berger et al. |
| 2007/0219943 A1 | 9/2007 | Draughn, Jr. |
| 2008/0133623 A1 | 6/2008 | Tsuchida et al. |
| 2009/0083337 A1 | 3/2009 | Parees et al. |
| 2010/0076895 A1* | 3/2010 | Spencer ............ G06Q 10/0637 705/7.36 |
| 2011/0258158 A1* | 10/2011 | Resende, Jr ...... G06F 16/24532 707/E17.044 |
| 2016/0224647 A1 | 8/2016 | Guo et al. |
| 2016/0371355 A1 | 12/2016 | Massari et al. |
| 2017/0039260 A1 | 2/2017 | Adya et al. |
| 2017/0300469 A1 | 10/2017 | Mirhaji |
| 2017/0316110 A1 | 11/2017 | Srinivasan et al. |
| 2018/0004833 A1* | 1/2018 | Mukherjee ............ G06F 16/283 |
| 2019/0384745 A1 | 12/2019 | Gorelik |
| 2019/0384847 A1* | 12/2019 | Bobbala ............ G06F 16/2456 |
| 2021/0182293 A1* | 6/2021 | Zhang ............... G06F 16/24542 |
| 2021/0334251 A1* | 10/2021 | Mire ..................... G06F 16/182 |

* cited by examiner

| 312 | A | | | | B | | | | C | | | D | | | E | | |
|---|---|---|---|---|---|---|---|---|---|---|---|---|---|---|---|---|---|
| | 1 | 2 | 3 | 4 | 1 | 5 | 6 | 7 | 5 | 8 | 9 | 10 | 11 | 12 | 13 | 10 | 14 |
| x | 0 | 0.9 | 0 | 0.1 | 0.2 | 0 | 0.2 | 0 | 0 | 0.1 | 0.3 | 0 | 0 | 0 | 0 | 0.1 | 0.1 |
| y | 0.1 | 0 | 0 | 0 | 0.1 | 0.1 | 0.8 | 0.9 | 0 | 0 | 0.2 | 0.1 | 0 | 0 | 0.3 | 0 | 0.2 |

316a, 316b, 316c, 316d, 316e, 316f, 316g, 316h, 316i, 316j, 316k, 316l, 316m, 316n, 316o, 316p, 316q 314a, 314b

FIG. 3B

US 11,321,285 B2

AUTOMATIC DATABASE SCRIPT GENERATION FOR COPYING DATA BETWEEN RELATIONAL DATABASES

TECHNICAL FIELD

The present disclosure relates generally to database management, and more particularly, to automatic database script generation for copying data between relational databases.

BACKGROUND

Organizations frequently store their data in relational databases. The structure of a relational database is referred to as its schema.

SUMMARY

Organizations often maintain multiple relational databases. For example, an organization may maintain an operational database and a reporting database. The operational database may store transactional data and support real-time applications that are used by end users. On the other hand, the reporting database may be used by data engineers for analysis. For example, data engineers may generate reports from the reporting database to identify the current state of the organization. The reporting database typically stores copies of transactional data obtained from the operational database and/or derived data generated from the transactional data of the operational database.

Employing a reporting database, rather than simply generating reports directly from the operational database, has several advantages. As an example, the use of a reporting database reduces the load on the operational database, potentially improving the performance of the operational database. As another example, the use of a reporting database may lead to faster reporting results, because the operations performed on the reporting database are limited to those related to reporting processes. As a further example, the use of two databases allows for independent optimization of both the operational database and the reporting database. For example, because the operational database stores transactional data generated by real-time applications, it is typically subject to frequent, short transactions that include data updates. Accordingly, the operational database may be designed as a write-efficient database. For instance, the operational database may be a normalized database that is optimized for additions, deletions, and updates. On the other hand, the reporting database is typically optimized for fast data retrieval (i.e., read-efficient), because of the large quantity of data that tends to be accessed when using the database to generate reports. Because both the operational database and the reporting database are optimized for different purposes, the schemas of the databases tend to be quite different from one another. For example, the schema of the operational database may be significantly more complex than the schema of the reporting database.

To help ensure up-to-date reports, the reporting database should regularly be updated with data from the operational database. Data may be copied from the operational database to the reporting database daily (for example, during a nightly batch process), or at any other regular frequency. To extract data from the operational database and load it into the reporting database, system administrators typically develop extract, transform, and load (ETL) scripts, which they then execute on the databases. Because of the relational nature of the databases and, in particular, the potentially complex nature of the operational database schema, care should be taken to develop accurate ETL scripts. For example, if a system administrator does not have up to date knowledge of the current schema of the operational database, he may easily miss copying some of the data from the operational database to the reporting database. Therefore, because the development of ETL scripts is typically a manual process, it tends to be both time consuming and error prone.

This disclosure contemplates a database management tool designed to automatically generate ETL scripts that are used to extract data from the operational database and load data into the reporting database. As input, a user may provide the tool with a plain text instruction specifying columns of the reporting database (destination columns) that are to be populated with data obtained (either directly or indirectly) from the operational database. As output, the tool generates an ETL script consisting of a set of executable program code statements that, when executed, perform the task specified by the plain text instruction. To do this, the tool first parses the input instruction, to identify the names of the destination columns specified in the instruction. The tool then compares these names to the names of the columns stored in the operational database (source columns), by calculating a similarity index between each destination column name and each source column name (or a term related to the source column name as indicated in a lexicon). The tool identifies, as relevant to the input instruction, those source columns for which a calculated similarity index is greater than a threshold, and then uses the identified source columns to generate a graphical representation of the portions of the schema of the operational database that are relevant to the instruction. This graphical representation illustrates the identified columns, the tables storing the identified columns, as well as the relationships among the tables and identified columns. Finally, the tool uses a machine learning algorithm, along with the graphical representation, to convert the instruction into a set of executable statements configured to extract data from the identified source columns of the operational database and load the data (or other data derived from the extracted data) into the destination columns of the reporting database. An embodiment of the tool is described below.

According to one embodiment, a system includes a first database, a second database, a memory, and a hardware processor communicatively coupled to the memory. The first database stores data according to a schema. The first database includes a set of source tables and a set of source columns. Each table of the set of source tables includes a subset of columns of the set of source columns. Each column of the set of source columns is assigned a source column name of a set of source column names. The memory stores a graphical representation of the schema of the first database. The graphical representation includes a set of nodes. Each node of the set of nodes corresponds to at least one of a table of the set of source tables of the first database and a column of the set of source columns of the first database. The graphical representation also includes a set of connections. Each connection of the set of connections is between a pair of nodes of the set of nodes and indicates a relationship between the pair of nodes. The memory also stores a lexicon that includes a set of terms. Each term of the set of terms is associated with a source column name of the set of source column names.

The hardware processor receives an instruction to transfer data from the first database to the second database. The instruction includes a list of destination column names. Each destination column name of the list of destination column names specifies a column of a set of destination columns of the second database into which a portion of data from the first database is to be transferred. In response to receiving the instruction, the processor identifies the list of destination column names from the instruction. The processor also generates, using the set of source column names and the list of destination column names, a similarity matrix that includes a set of similarity scores. The set of source column names corresponds to a first dimension of the similarity matrix, and the list of destination column names corresponds to a second dimension of the similarity matrix. Each similarity score of the set of similarity scores corresponds to a specific source column name of the set of source column names and a specific destination column name of the list of destination column names, and indicates a degree of similarity between the specific destination column name and at least one of the specific source column name and a term of the set of terms of the lexicon associated with the specific source column name. The processor additionally identifies, using the similarity matrix, a subset of source columns. For each source column of the subset of source columns, there exists a similarity score of the set of similarity scores corresponding to a source column name assigned to the source column, which is greater than a threshold. The processor further generates, from the graphical representation of the schema of the first database and using the subset of source columns, a pruned graphical representation that includes a subset of nodes of the set of nodes. Each node of the subset of nodes is associated with a column of the subset of source columns. The processor also generates, using the instruction and the pruned graphical representation, executable program code configured, when executed, to select data from the first database and insert the data into the second database. The data is selected from locations in the first database specified by the subset of nodes of the pruned graphical representation and is inserted into locations in the second database specified by the list of destination column names. The processor additionally executes the executable program code.

Certain embodiments provide one or more technical advantages. As an example, an embodiment automatically extracts data from an operational database and loads the data (or other data derived from the extracted data) into a reporting database, thereby reducing the time and likelihood of errors as compared with manually extracting and loading the data. As another example, an embodiment automatically converts a plain text instruction into executable program code statements (for example, SQL statements) that can be executed on a system of databases. As another example, an embodiment automatically identifies columns of an operational database that are to be used to populate columns of a reporting database, by converting the names of the source columns and the destination columns into a set of features and calculating similarity indices between vectors formed from the features. As a further example, an embodiment reduces the computational resources associated with using an operational database for reporting purposes, by providing a simple and automatic method for transferring data from the operational database into a read-efficient reporting database, thereby reducing the load on the operational database.

The system described in the present disclosure may particularly be integrated into a practical application of a database management tool for use by an organization that wishes to maintain both an operational database and a reporting database. Rather than relying on data engineers to develop ETL scripts to transfer data from the operational database to the reporting database, the tool can convert any format of input instructions, identifying columns of the reporting database which are to be populated using the operational database, into an ETL script written in a specific computer readable code language (for example, SQL) that is designed to extract data from the operational database and load it (or data derived from it) into the reporting database. In this manner, an individual with limited knowledge of the (potentially very complicated) schema of the operational database can nevertheless accurately extract data from the operational database and load it into the reporting database, for subsequent analysis. Furthermore, rather than relying on a nightly batch process to populate the reporting database with data from the operational database, an individual seeking to perform an analysis on data that is more up-to-date, may simply provide the tool with a list of columns from the reporting database that he/she would like to analyze and in return receive a script that he/she can execute to populate those columns with current values of data obtained from the operational database.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 3B illustrates an example of a similarity matrix populated with similarity indices calculated using the process illustrated in FIG. 3A;

DETAILED DESCRIPTION

Embodiments of the present disclosure and its advantages may be understood by referring to FIGS. 1 through 5 of the drawings, like numerals being used for like and corresponding parts of the various drawings.

I. System Overview

Figure 1:
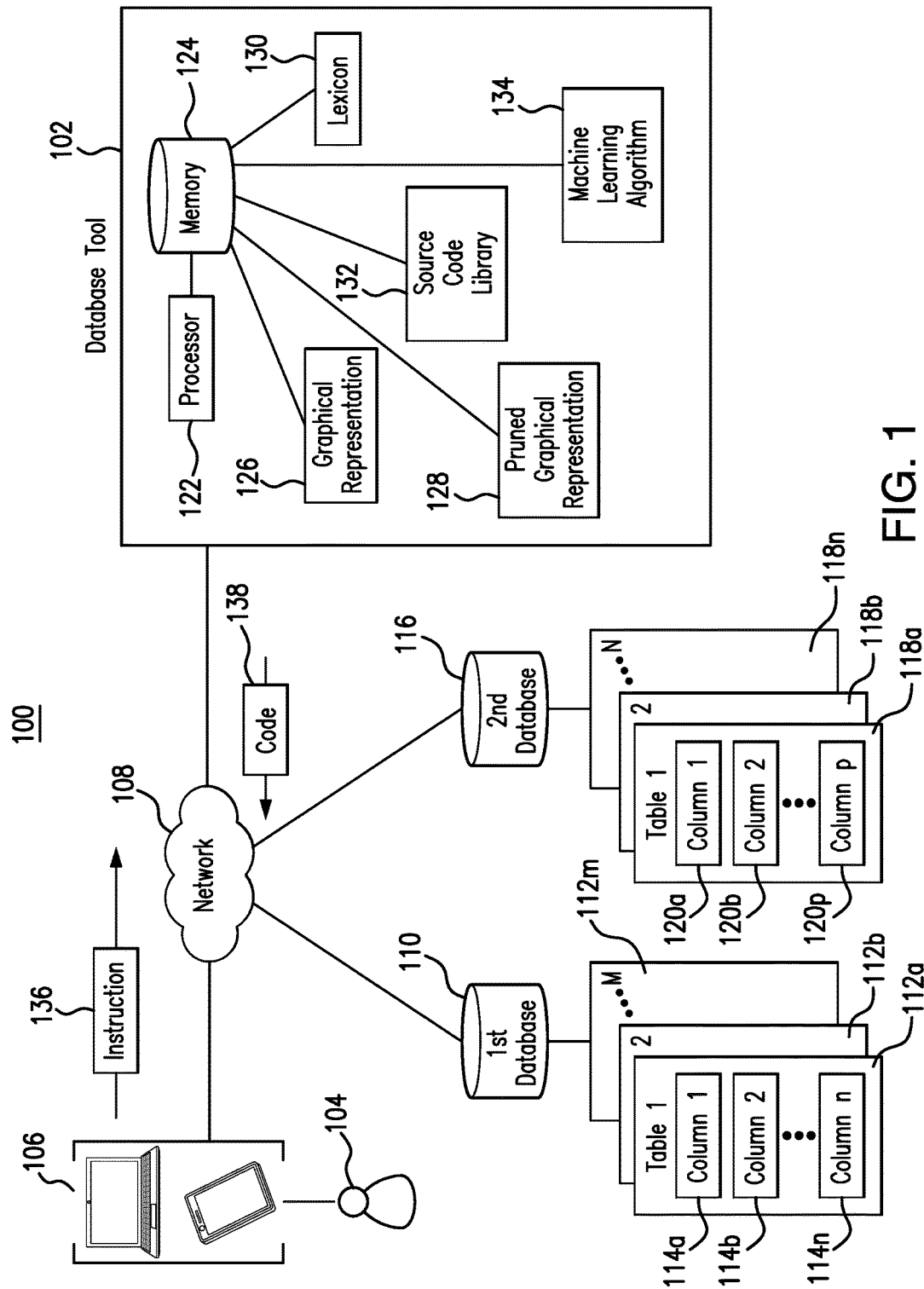
FIG. 1 illustrates an example database management system.

FIG. 1 illustrates an example database management system 100 that includes database tool 102, user(s) 104, device(s) 106, network 108, first database 110, and second database 116. While the discussion that follows describes first database 110 and second database 116 as relational databases, this disclosure contemplates that first database 110 and/or second database 116 may be any type of database, including non-relational databases. Generally, database tool 102 receives an instruction 136, specifying the names of one or more columns 120 of second database 116 into which data stored in first database 110 (or data derived from data stored in first database 110) is to be transferred. The columns 120 specified in instruction 136 may already exist in second database 116 or may need to be created in second database 116. In response to receiving instruction 136, database tool 102 identifies those columns 114 of first database 110 that are relevant to instruction 136 and uses the identified columns 114 to prune a graphical representation 126 of the schema of first database 110 into a pruned graphical representation 128, as described in further detail below, in the discussion of FIGS. 2A through 3C. Database tool 102 then uses machine learning algorithm 134, along with pruned graphical representation 128, to convert instruction 136 into executable program code 138 configured to extract data from first database 110 and use this data to populate those columns 120 of second database 116 specified in instruction 136, as described in further detail below, in the discussion of FIG. 4.

Devices 106 are used by users 104 located on network 108 to communicate with database tool 102. As an example, in certain embodiments, device 106 is used by user 104 to submit instruction 136 to database tool 102. Instruction 136 specifies columns 120 of second database 116 into which data stored in first database 110 (or data derived from the data stored in first database 110) is to be transferred. Instruction 136 may specify such columns 120 in any suitable manner. For example, in certain embodiments, instruction 136 is a plain text instruction. For instance, instruction 136 may state "Update columns customer name, customer address, and shipment data." As another example, in some embodiments, instruction 136 may simply include a list of column names. In certain embodiments, instruction 136 may include one or more action words, specifying actions to be performed on second database 116. For example, instruction 136 may include the action word "create," and specify that database tool 102 is to generate a script 138 that includes (1) a statement to create a table 118 in second database 116 and/or (2) statements to create one or more columns 120 in second database 116. As another example, instruction 136 may include the action word "update," and specify that database tool 102 is to generate a script 138 that includes (1) a statement to update a table 118 in second database 116 and/or (2) statements to update one or more columns 120 in second database 116. In certain embodiments, device 106 is used by user 104 to instruct database tool 102 to execute the script 138 of executable code generated by database tool 102. In some embodiments, database tool 102 is configured to automatically execute script 138 in response to creating script 138.

Devices 106 include any appropriate device for communicating with components of system 100 over network 108. For example, devices 106 may be a telephone, a mobile phone, a computer, a laptop, a wireless or cellular telephone, a tablet, a server, and IoT device, and/or an automated assistant, among others. This disclosure contemplates devices 106 being any appropriate device for sending and receiving communications over network 108. Device 106 may also include a user interface, such as a display, a microphone, keypad, or other appropriate terminal equipment usable by user 104. In some embodiments, an application executed by a processor of device 106 may perform the functions described herein.

Network 108 facilitates communication between and amongst the various components of system 100. This disclosure contemplates network 108 being any suitable network operable to facilitate communication between such components. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

First database 110 is a relational database. In certain embodiments, first database 110 is an operational database that is designed to support real-time applications that are used by end users, and that therefore may be subject to frequent write transactions. Accordingly, first database 110 may be a write-efficient relational database. For example, first database 110 may be a normalized database. First database 110 stores data in columns 114 of tables 112. First database 110 may include any number of tables 112, and each table 112 may include any number of columns 114. The set of columns 114 stored in first database 110 may include primary key columns and foreign key columns. For example, consider an example in which first table 112a is a table of customer information, second table 112b is a table of order information, and third table 112c is a table of shipment information, as illustrated below:

TABLE 112a

Customer Information

| Column 114a - Customer ID | Column 114b - Name | Column 114c - Address |
|---|---|---|
| 1 | Name 1 | Number 1 Street 1, City 1 |
| 2 | Name 2 | Number 2 Street 2, City 2 |
| 3 | Name 3 | Number 3 Street 3, City 3 |

TABLE 112b

Order Information

| Column 114d - Order ID | Column 114e - Customer ID | Column 114f - Shipment ID | Column 114g - Price | Column 114h - Tax |
|---|---|---|---|---|
| 1 | 3 | 2 | 10.50 | 2.10 |
| 2 | 1 | 1 | 45.00 | 8.75 |

TABLE 112c

Shipment Information

| Column 114i - Shipment ID | Column 114j - Departure Date | Column 114k - Arrival Date |
|---|---|---|
| 1 | Feb. 5, 2020 | Feb. 9, 2020 |
| 2 | Mar. 21, 2020 | Mar. 29, 2020 |

Here, first column 114a of first table 112a is a primary key column in which each entry uniquely identifies a row of first table 112a corresponding to a given customer (i.e. a customer name and address), first column 114d of second table 112b is a primary key column in which each entry uniquely identifies a customer order, and first column 114i of third table 112c is a primary key column in which each entry uniquely identifies a customer shipment. Second table 112b is linked to first table 112a through foreign key column 114e, and second table 112b is also linked to third table 112c through foreign key column 114f While the above example describes tables 112 as storing information relating to customers and their orders, tables 112 may store any type of information.

Second database 116 is a relational database. In certain embodiments, second database 116 is a reporting database that stores data that is used to generate reports regarding the current state of the organization to which second database 116 belongs. Because the report generating process may involve significant data retrieval from second database 116, second database 116 may be designed as a read-efficient database. For example, second database 116 may be an unnormalized database. Second database 116 stores data in columns 120 of tables 118. Second database 116 may include any number of tables 118, and each table 118 may include any number of columns 120. The set of columns 120 stored in second database 116 may include primary key columns and foreign key columns. Second database 116 may store copies of data stored in first database 110 and/or data that has been derived from data stored in first database 110. For example, consider an example in which first database 110 includes a column 114m storing an amount of state tax and a column 114n storing an amount of federal tax. Second database 116 may store a copy of state tax column 114m as column 120h and a copy of federal tax column 114n as columns 120i and/or a total tax column 120p, in which each entry in total tax column 120p is the sum of the corresponding entries in state tax column 114m and federal tax column 114n. In certain embodiments, database tool 102 is configured to generate scripts 138 of executable code that are configured to create new tables 118 and/or new columns 120 in second database 116. In some embodiments, database tool 102 is configured to generate scripts 138 of executable code that are configured to update existing tables 118 and/or existing columns 120 of second database 116.

As seen in FIG. 1, database tool 102 includes a processor 122 and a memory 124. This disclosure contemplates processor 122 and memory 124 being configured to perform any of the functions of database tool 102 described herein. Generally, database tool 102 receives an instruction 136 to populate specified columns 120 of second database 116 with data that is stored in first database 110 and/or data that is derived from data that is stored in first database 110. Database tool 102 then identifies those columns 114 of first database 110 that are relevant to instruction 136 and uses the identified columns 114 to generate a pruned graphical representation 128 of the portions of the schema of first database 110 that are relevant to instruction 110, as described in further detail below, in the discussion of FIGS. 2A through 3C. Database tool 102 uses machine learning algorithm 134, along with pruned graphical representation 128, to translate instruction 136 into a script 138 of executable code configured to extract data from first database 110 and use this data to populate those columns 120 of second database 116 specified in instruction 136, as described in further detail below, in the discussion of FIG. 4.

Processor 122 is any electronic circuitry, including, but not limited to microprocessors, application specific integrated circuits (ASIC), application specific instruction set processor (ASIP), and/or state machines, that communicatively couples to memory 124 and controls the operation of database tool 102. Processor 122 may be 8-bit, 16-bit, 32-bit, 64-bit or of any other suitable architecture. Processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 122 may include other hardware and software that operates to control and process information. Processor 122 executes software stored on memory to perform any of the functions described herein. Processor 122 controls the operation and administration of database tool 102 by processing information received from network 108, device(s) 106, first database 110, second database 116, and/or memory 124. Processor 122 may be a programmable logic device, a microcontroller, a microprocessor, any suitable processing device, or any suitable combination of the preceding. Processor 122 is not limited to a single processing device and may encompass multiple processing devices.

Memory 124 may store, either permanently or temporarily, data, operational software, or other information for processor 122. Memory 124 may include any one or a combination of volatile or non-volatile local or remote devices suitable for storing information. For example, memory 124 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 124, a disk, a CD, or a flash drive. In particular embodiments, the software may include an application executable by processor 122 to perform one or more of the functions described herein.

In certain embodiments, memory 124 may also store graphical representation 126, pruned graphical representation 128, lexicon 130, source code library 132, and/or machine learning algorithm 134. Graphical representation 126 is a graphical representation of the schema of first database 110. Graphical representation 126 represents the tables 112 and columns 114 of first database 110 as a set of nodes and illustrates relationships amongst the various tables 112 and columns 114 of first database 110 using connections between the nodes, as described in further detail below in the discussion of FIGS. 2A and 2B. In certain embodiments, database tool 102 receives graphical representation 126 from an external source and stores graphical representation 126 in memory 124. In some embodiments, database tool 102 generates and updates graphical representation 126, as described in further detail below, in the discussion of FIG. 2B.

Pruned graphical representation 128 is a graphical representation of the portions of the schema of first database 110 that are relevant to instruction 136. Database tool 102 is configured to generate pruned graphical representation 128 from graphical representation 126 by identifying those columns 114 of first database 110 that are similarly named (or otherwise related) to the columns 120 of second database 116 specified in instruction 136. The manner by which database tool 102 generates pruned graphical representation 128 from graphical representation 126 is described in further detail below, in the discussion of FIGS. 3A through 3C.

Lexicon 130 provides a set of associations between the names of source columns 114 stored in first database 110 and related terms. These related terms may be used for the names of current columns 120 stored in second database 116 and/or the names of potential future columns 120 to be stored in database 116. Lexicon 130 may provide the associations in any suitable manner. For example, in certain embodiments, these associations are explicitly provided in lexicon 130. For instance, lexicon 130 may include statements such as "Customer ID column is the same as ID_customer column," and "Total tax column is equal to the state tax column plus the federal tax column. As another example, in some embodiments, the associations may be derived from the information provided in lexicon 130. For example, lexicon 130 may include a statement such as "the purchase price of an item may be referred to as a price, a cost, or an expenditure," from which an association between the column name "purchase price," and the terms "price," "cost," and "expenditures" may be derived. As another example, lexicon 130 may include a statement that "the total tax paid includes a state tax component and a federal tax component," from which an association between the column name "total tax," and the terms "state tax," and "federal tax" may be derived. Database tool 102 uses lexicon 130 to identify columns 114 of first database 110 that are relevant to a given instruction 136, as described in further detail below, in the discussion of FIG. 3A.

Source code library 132 is a library of source code expressions that database tool 102 may choose from when generating script 138. Source code library 132 may include expressions associated with extracting data from first database 110, creating a table 118 in second database 116, creating a column 120 in second database 116, updating the contents of an existing column 120 in second database 116, and/or any other suitable expressions. Source code library 132 may include source code expressions written in any suitable language. For example, in certain embodiments, source code library 132 includes SQL expressions.

Machine learning algorithm 134 is an algorithm trained to convert an instruction 136—specifying one or more columns 120 of second database 116 that are to be populated using data from first database 110 (destination columns 120)—into a script 138 of executable statements that are configured, when executed, to extract data from first database 110 and load data into the specified columns 120 of second database 116. Instruction 136 may include words associated with actions to be performed on second database 116 (e.g., create, update, etc.) and/or words identifying destination columns 120. As used in this disclosure, a word includes any collection of characters, and is not limited to dictionary words. Machine learning algorithm 134 is configured to parse instruction 136 and to identify those words of instruction 136 that are associated with actions and/or those words identifying destination columns 120. The words that are associated with actions are independent of the schema of first database 110. Accordingly, machine learning algorithm 134 is configured to convert these words directly into executable code statements. For example, if instruction 136 includes the words "create table customer," machine learning algorithm 134 is configured to convert these words into one or more executable statements that are configured, when executed, to create a table 118 named "customer" in second database 116. On the other hand, the words that identify destination columns 120 are related to the schema of first database 110, in the sense that data from first database 110 is to be used to populate the destination columns 120. Accordingly, machine learning algorithm 134 is configured to use pruned graphical representation 128 to convert these words into a set of executable statements configured, when executed, to extract data from the columns 114 of first database 110 that are identified in pruned graphical representation 128, and load that data (or other data derived from that data) into second database 116. For example, machine learning algorithm 134 may be configured to decompose pruned graphical representation 128 into a series of SELECT SQL statements to be executed on first database 110.

When converting instruction 136 into script 138, the context of each word included in instruction 136 is important; machine learning algorithm 134 should not consider each word of instruction 136 independently of the others. For example, even though the phrases "create table update" and "update table create" include the same three words, the first phrase is an instruction to create a table within second database 116 with the name update, while the second phrase is an instruction to update an already existing table in second database 116 named create. Accordingly, machine learning algorithm 134 should convert these two phrases into different sets of executable statements. As another example, machine learning algorithm 134 should generate the same set of executable statements regardless of whether instruction 136 is presented in active or passive form. For instance a first instruction 136 which includes the phrase "create a table named Customer with columns customer ID, customer name, and customer address," should lead to the same set of executable statements 138 as a second instruction 136 with includes the phrase "a table named Customer with columns customer ID, customer name, and customer address should be created." Because the context of the words that are included in instruction 136 is important, machine learning algorithm 134 should be an algorithm that considers each word of instruction 136 in relation to the other words of instruction 136. For example, in certain embodiments, machine learning algorithm 134 is a long short-term memory machine learning algorithm. Further details of the manner by which database tool 102 uses machine learning algorithm 134 to convert instruction 136 into script 138 are presented below, in the discussion of FIG. 4.

Modifications, additions, or omissions may be made to the systems described herein without departing from the scope of the invention. For example, system 100 may include any number of users 104, devices 106, networks 108, first databases 110, and second databases 116. The components may be integrated or separated. Moreover, the operations may be performed by more, fewer, or other components. Additionally, the operations may be performed using any suitable logic comprising software, hardware, and/or other logic.

II. Graphical Representation of a Database Schema

Figure 2A:
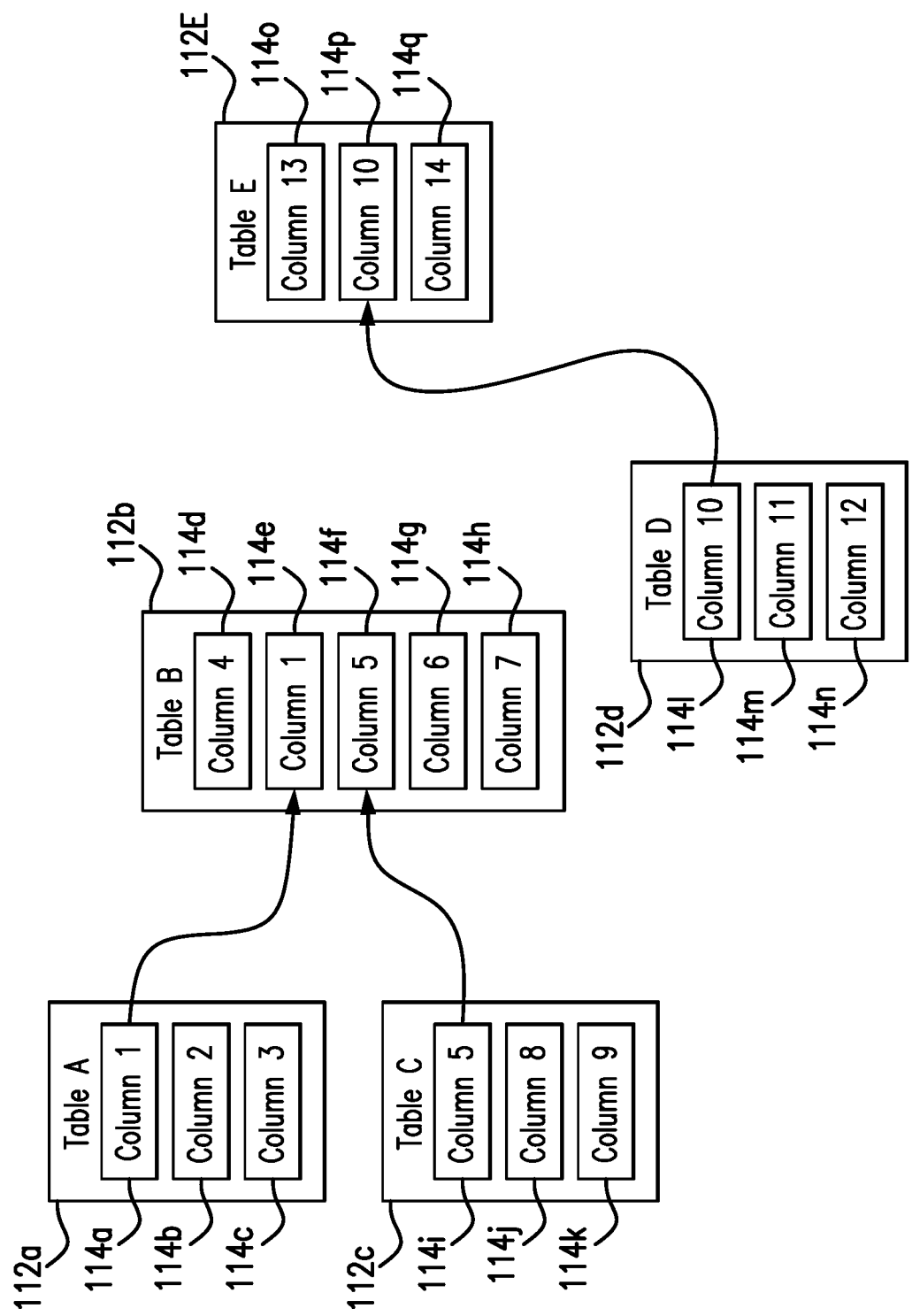
FIG. 2A illustrates an example relational database schema for a source relational database of the database management system of FIG. 1 from which data is to be transferred.
Figure 2B:
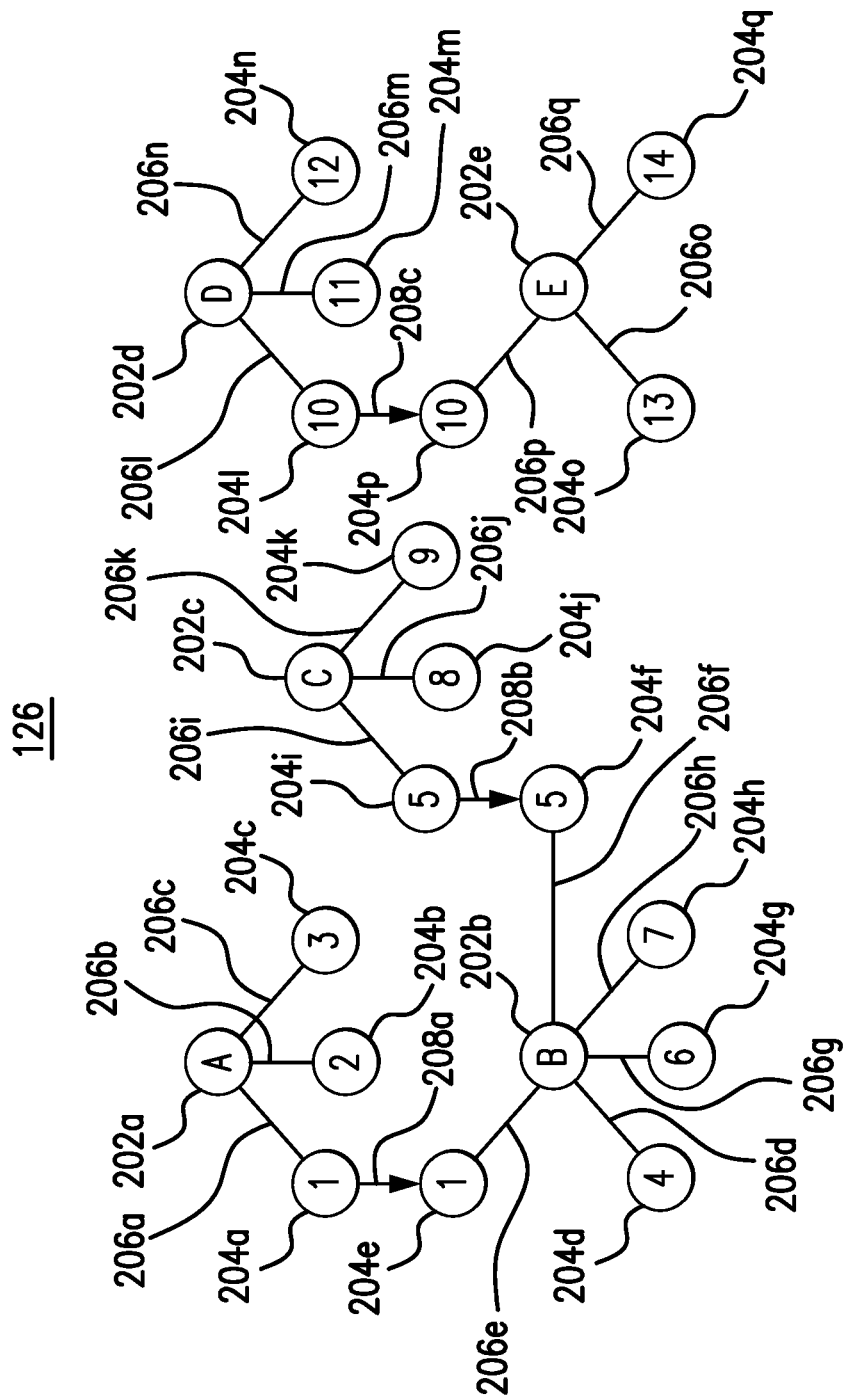
FIG. 2B illustrates an example graphical representation of the relational database schema presented in FIG. 2A.

Database tool 102 makes use of a graphical representation 126 of first database 110 in order to identify the columns 114 of first database 110 from which to extract data. FIGS. 2A and 2B present an example schema of first database 110 and an example graphical representation 126 correspond to the example database schema, respectively.

As illustrated in FIG. 2A, first database 110 includes a set of tables 112a through 112e. Each table 112 includes a set of columns 114. For example, first table 112a includes columns 114a through 114c, second table 112b includes columns 114d through 114h, third table 112c includes columns 114i through 114k, fourth table 112d includes columns 114l through 114n, and fifth table 112e includes columns 114o through 114q. The tables 112 of first database 110 may be related to one another through primary key-foreign key pairs. For example, column 114a of first table 112a is a primary key column and column 114e of second table 112b is a corresponding foreign key column. Primary key column 114a includes a set of primary keys, each of which uniquely identifies a row of first table 112a. For example, as described above and reproduced for clarity below, first table 112a may be a table of customer information and second table 112b may be a table of order information:

TABLE 112a

Customer Information

| Column 114a - Customer ID | Column 114b - Name | Column 114c - Address |
|---|---|---|
| 1 | Name 1 | Number 1 Street 1, City 1 |
| 2 | Name 2 | Number 2 Street 2, City 2 |
| 3 | Name 3 | Number 3 Street 3, City 3 |

TABLE 112b

Order Information

| Column 114d - Order ID | Column 114e - Customer ID | Column 114f - Shipment ID | Column 114g - Price | Column 114h - Tax |
|---|---|---|---|---|
| 1 | 3 | 2 | 10.50 | 2.10 |
| 2 | 1 | 1 | 45.00 | 8.75 |

Here, column 114a of first table 112a stores a set of primary keys in the form of Customer IDs. Each customer ID uniquely corresponds to a customer name stored in column 114b and a customer address stored in column 114c. Column 114e of second table 112b then stores a set of corresponding foreign keys. Each foreign key stored in column 114e of second table 112b links to a primary key stored in column 114a of first table 112a. For instance, foreign key column 114e indicates that an order corresponding to Order ID 1 was placed by a customer with Customer ID 3. Therefore, Order ID 1 was placed by a customer with name "Name 3," who is living at address "Number 3 Street 3, City 3." Other examples of primary key-foreign key pairs in first database 110 include primary key column 114i of third table 112c and corresponding foreign key column 114f of second table 112b, as well as primary key column 114l of fourth table 112d and second key column 114p of fifth table 112e.

In certain embodiments, the pair of columns 114 belonging to a primary key-foreign key pair may both have the same names. For example, as illustrated in FIG. 2A, primary key column 114a and foreign key column 114e both share the same name, as denoted by the fact that both columns are labelled "column 1." In some embodiments, the pair of columns 114 belonging to a primary key-foreign key pair may have similar, but somewhat different names to one another. For example, a primary key column 114 of first database 110 may be named "Customer ID," while a corresponding secondary key column 114 of first database 110 may be named "Customer_ID," "ID-customer," or any other similar name.

FIG. 2B presents an example graphical representation 126 of the schema of first database 110, as illustrated in FIG. 2A. As illustrated in FIG. 2B, graphical representation 126 includes a node 202 corresponding to each table 112 of database 110. For example, graphical representation 126 includes node 202a corresponding to table 112a, node 202b corresponding to table 112b, node 202c corresponding to table 112c, node 202d corresponding to table 112d, and node 202e corresponding to table 112e. Graphical representation 126 additionally includes a node 204 corresponding to each column 114 of database 110. For example, graphical representation 126 includes nodes 204a through 204c corresponding to columns 114a through 114c of table 112a, nodes 204d through 204h corresponding to columns 114d through 114h of table 112b, nodes 204i through 204k corresponding to columns 114i through 114k of table 112c, nodes 204l through 204n corresponding to columns 114l through 114n of table 112d, and nodes 204o through 204q corresponding to columns 114o through 114q of table 112e. In certain embodiments, table nodes 202 may be distinguished from column nodes 204. For example, table nodes 202 may be distinguished from column nodes 204 using a label or in any other suitable manner.

Graphical representation 126 may additionally include a set of connections 206 and 208. Connections 206 indicate the relationships between table nodes 202 and column nodes 204. For example, connection 206a from column node 204a to table node 202a indicates that column 114a (represented by column node 204a) belongs to table 112a (represented by table node 202a). Connections 208 indicate primary key-foreign key pairs. For example, connection 208a between node 204a and node 204e indicates that column 114a is a primary key and column 114e is a foreign key of a primary key-foreign key pair. Similarly, connection 208b between node 204f and node 204i indicates that column 114i is a primary key and column 114f is a foreign key of a primary key-foreign key pair, and connection 208c between node 204l and node 204p indicates that column 114l is a primary key and column 114p is a foreign key of a primary key-foreign key pair.

In certain embodiments, database tool 102 receives graphical representation 126 from an external source and stores graphical representation 126 in memory 124. For example, database tool 102 may receive graphical representation 126 from user 104. In some embodiments, database tool 102 is configured to create graphical representation 126. Database tool 102 may create graphical representation 126 in any suitable manner. For example, database tool 102 may scan first database 110 and identify the tables 112 stored in first database 110. For each table 112 that it identifies, database tool 102 may generate a node 202 corresponding to the table, and a set of nodes 204 corresponding to the columns 114 of the table. Database tool 102 may additionally add a set of connections 206, which indicate that the nodes 206 represent columns of the table represented by node 202. In certain embodiments, database tool 102 stores connections 206 in memory 124 as node pairs. For example, database tool 102 may store connection 206a in memory as the pair (202a, 204a). Database tool 102 may also identify the primary key-foreign key pairs present in database 110 and generate a connection 208 for each primary key-foreign key pair. In certain embodiments, database tool 102 stores connections 208 in memory 124 as ordered node pairs, where the first node in the ordered node pair corresponds to the primary key and the second node in the ordered node pair corresponds to the foreign key. For example, database tool 102 may store connection 208a in memory as the ordered pair (204a, 204e), indicating that node 204a corresponds to the primary key column 114a and node 204e corresponds to the foreign key column 114e.

In certain embodiments, database tool 102 is configured to update graphical representation 126 in response to any changes made to the schema of first database 110. For example, database tool 102 may update graphical representation 126 by adding a new node 202 when a new table 112 is added to first database 110. As another example, database tool 102 may update graphical representation 126 by adding a new node 204 when a new column 114 is added to first database 110. Database tool 102 may determine that changes have been made to the schema of first database 110 in any suitable manner. For example, in certain embodiments, database tool 102 may receive an alert from first database 110 indicating that a new table 112 and/or a new column 114 has been added to first database 110. As another example, in certain embodiments, database tool 102 may receive a message 136 from user 104 indicating that a new table 112 and/or a new column 114 has been added to first database 110. As a further example, in certain embodiments, database tool 102 may be configured to scan first database 110 at regular intervals to determine whether any new tables 112 and/or new columns 114 have been added.

While FIG. 2B presents a pictorial representation of graphical representation 126, database tool 102 may store graphical representation 126, which includes nodes 202/204 and/or connections 206/208, in memory 124 in any suitable manner. For example, in certain embodiments, database tool 102 stores graphical representation 126 in memory 124 as a graph data structure in which the vertices of the data structure correspond to nodes 202 and/or 204, and the edges of the data structure correspond to connections 206 and/or 208. Additionally, while FIGS. 2A and 2B present an example in which first database 110 includes five tables 112, first database 110 may include any number of tables 112.

III. Pruned Graphical Representation

Figure 3A:
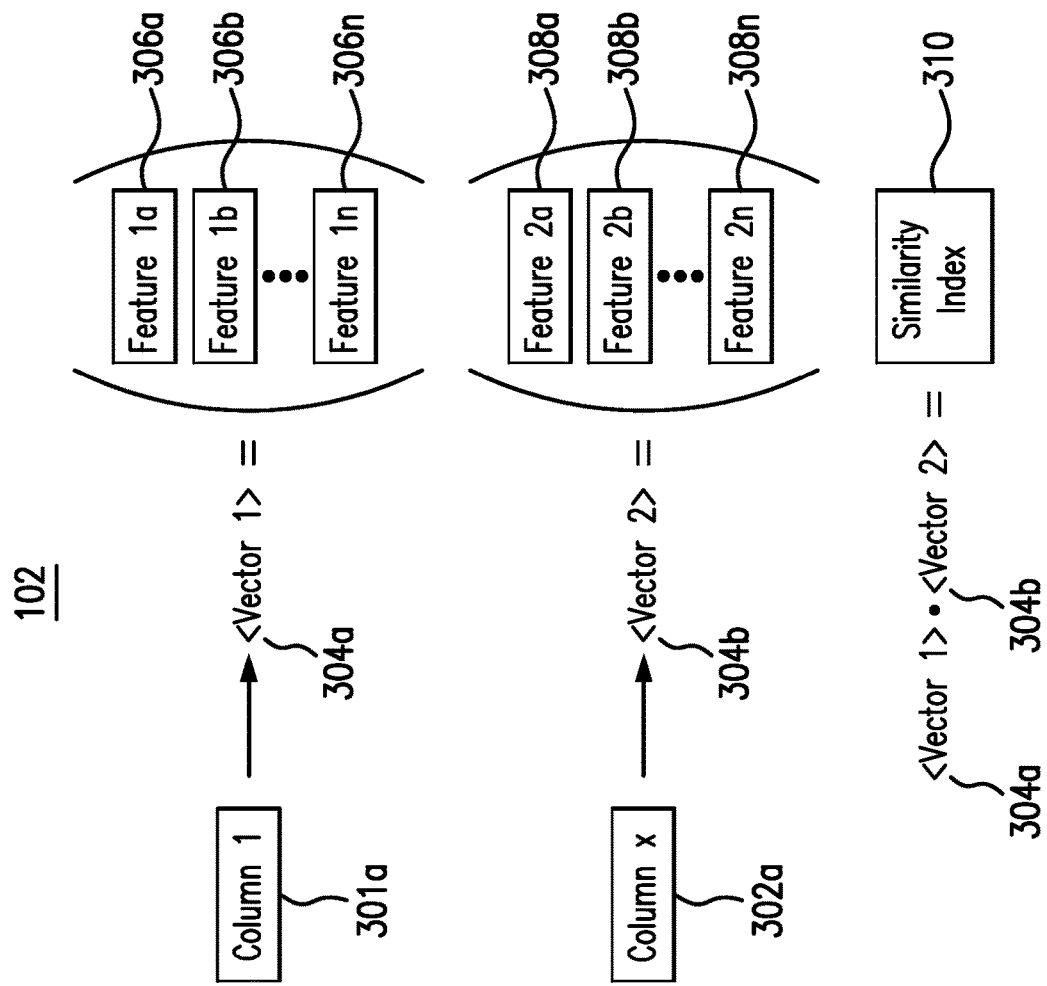
FIG. 3A illustrates an example of the process by which the database tool of FIG. 1 calculates a similarity index between a column of the source relational database of the database management system of FIG. 1 and a column of a destination relational database.
Figure 3C:
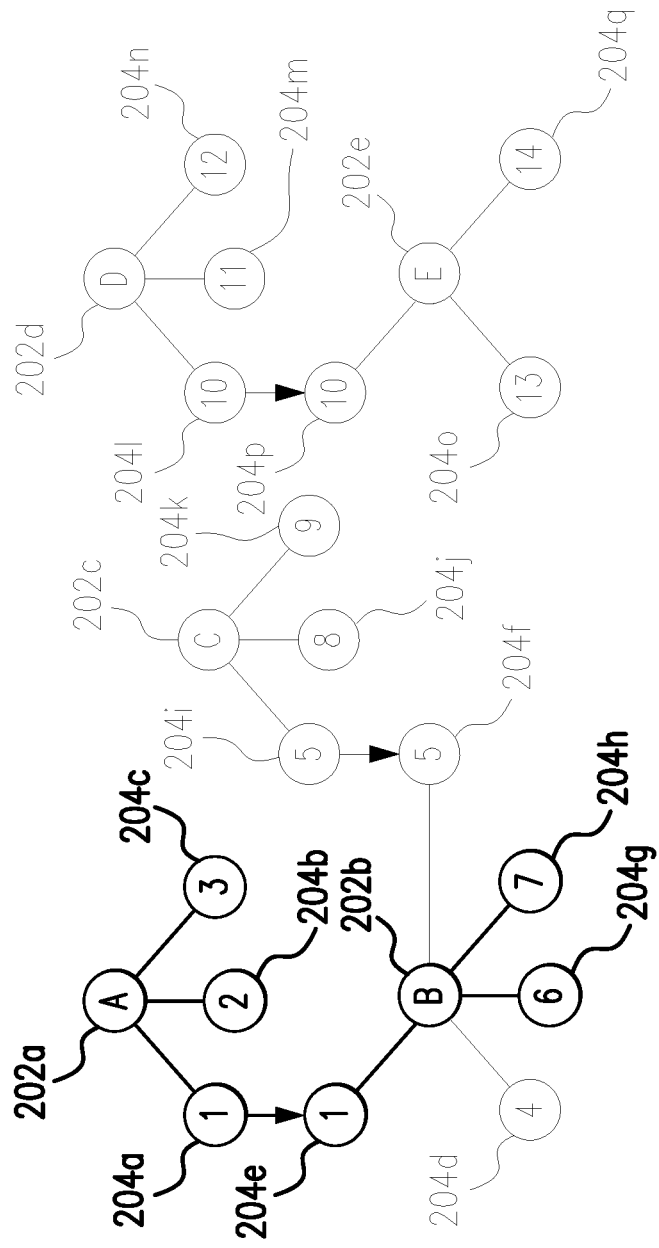
FIG. 3C illustrates an example pruned graphical representation of the relational database schema presented in FIG. 2A, generated from the graphical representation illustrated in FIG. 2B, using the similarity matrix of FIG. 3B.

In response to receiving an instruction 136 to transfer data from first database 110 into specified columns 120 of second database 116, database tool 102 first determines the columns 114 of first database 110 that are relevant to instruction 136 and uses these columns to generate a pruned graphical representation 128 of the portions of the schema of first database 110 that are relevant to instruction 136. FIGS. 3A through 3C present an example illustrating the process by which database tool 102 generates pruned graphical representation 128.

Database tool 102 automatically identifies those columns 114 of first database 110 (source columns) that are relevant to instruction 136, based on (1) a similarity between the names of the destination columns 120 specified in instruction 136 and the names of source columns 114 and/or (2) a similarity between the names of the destination columns 120 specified in instruction 136 and terms specified in lexicon 130 as related to source columns 114. FIG. 3A illustrates an example calculation performed by database tool 102 to determine a similarity index 310 between a name 301a assigned to a source column 114a of first database 110 and a name 302a specified in instruction 136 for a destination column 120a.

As illustrated in FIG. 3A, database tool 102 uses name 301a to generate a first set of features 306a through 306n and then forms vector 304a out of those features. Similarly, database tool 102 uses name 302a to generate a second set of features 308a through 308n and then forms vector 304b out of those features. Database tool 102 may generate any number of features 306a through 306n/308a through 308n. Database tool 102 may generate features 306 and 308 in any suitable manner. As an example, in certain embodiments database tool 102 generates features 306 and 308 based on the individual words present in name 301a and name 302a. For instance, consider a situation in which name 301a is "Customer_ID," and name 302a is "ID of Customer." The set of words that includes all of the words included in these names is: {Customer, ID, of}. Accordingly, database tool 102 may set vector 304a equal to {1, 1, 0}, to indicate that name 301a includes one instance of the word "Customer," and one instance of the word "ID," but no instances of the word "of." Similarly, database tool 102 may set vector 304b equal to {1, 1, 1} to indicate that name 302a includes one instance of the word "Customer," one instance of the word "ID," and one instance of the word "of." In certain embodiments, rather than considering every word included in both of names 301a and 302a, database tool 102 may consider only those words that do not correspond to any stop words of a set of stop words. The set of stop words may include commonly occurring words, such as "the," "a", "that," "of," etc. In such embodiments, the above example would lead to vector 304a equaling {1, 1}, to indicate that name 301a includes one instance of the word "Customer," and one instance of the word "ID," and vector 304b equaling {1, 1}, to indicate that name 302a includes one instance of the word "Customer," and one instance of the word "ID," where database tool 102 removed the word "of" from the set of all words included in names 301a and 302a, after determining that "of" is a stop word of a set of stop words. In certain embodiments, database tool 102 considers the case of the words included in names 301a and 302a when assigning features 306 and 308. In some embodiments, database tool 102 does not consider the case of the words included in names 301a and 302a. For example, in certain embodiments, database tool 102 considers the words "ID," "Id," and "id" to be different words, and in some embodiments, database tool 102 considers these words to be the same words.

As another example of the manner in which database tool 102 may generate features 306 and 308, in certain embodiments database tool 102 generates these features based on sequences of characters present in name 301a and name 302a. For example, database tool 102 may generate features 306 and 308 based on the set of all instances of three adjacent characters present in name 301a and/or 302a. For instance, consider a situation in which name 301a is "Ship Date," and name 302a is "Date of Shipment." The set of instances of three adjacent characters included in these names is: {Shi, p D, ate, hip, Da, ip, Dat, e o, f S, men, of, Sh, ipm, ent, to, of, pme}. Accordingly, database tool 102 may set vector 304a equal to {1, 1, 1, 1, 1, 1, 1, 0, 0, 0, 0, 0, 0, 0, 0, 0, 0}, to indicate the number of times each instance of three adjacent characters of the set of instances of three adjacent characters appears in name 301a. Similarly, database tool 102 may set vector 304b equal to {1, 0, 1, 1, 0, 0, 1, 1, 1, 1, 1, 1, 1, 1, 1, 1, 1} to indicate the number of times each instance of three adjacent characters of the set of instances of three adjacent characters appears in name 302a. Database tool 102 may generate features 306 and 308 based on sequences of any number of characters present in name 301a and 302a. Furthermore, database tool 102 may consider more than one sequence length. For example, database tool 102 may generate features 306 and 308 based on the set of all instances of three adjacent characters present in name 301a and/or 302a as well as the set of all instances of two adjacent characters present in name 301a and/or 302a.

Once database tool 102 has formed first vector 304a from features 306a through 306n, and second vector 304b from features 308a through 308n, database tool 102 determines similarity index 310 based on the dot product between first vector 304a and second vector 304b. For example, in certain embodiments, database tool 102 sets similarity index 310 equal to the normalized dot product between first vector 304a and second vector 304b.

While FIG. 3A illustrates an example similarity index calculation performed by database tool 102 between a name 301a assigned to a source column 114a of first database 110 and a name 302a specified in instruction 136 for a destination column 120a, database tool 102 may also calculate a similarity index 310 between destination column 120a and source column 114a by calculating a similarity index 310 between name 302a and one or more terms associated with name 301a, as indicated by lexicon 130. For example, consider a situation in which name 301a is "Sales Tax," and name 302a is "ST." Rather than simply computing similarity index 310 between the names "Sales Tax," and "ST," database tool 102 may consult lexicon 130 to determine that the phrase "Sales Tax" is also associated with the terms "Consumption Tax," "Goods Tax," and "ST." Accordingly, database tool 102 may consider each of these terms in calculating similarity index 310. For example, in certain embodiments, database tool 102 may calculate a similarity index between name 302a of destination column 120a and name 301a of source column 114a, as well as similarity indices between name 302a and each of the terms associated with name 301a, as indicated by lexicon 130. Database tool 102 may then set similarity index 310 equal to the largest of these calculated similarity indices.

Database tool 102 is designed to calculate a similarity index 310 between each destination column 120, specified in instruction 136, and each source column 114. The result of these calculations is a similarity matrix, with entries that include each of the calculated similarity indices. FIG. 3B presents an example similarity matrix 312 for an instruction 136 that specifies two destination columns 120, identified in FIG. 3B as "x" and "y." In certain embodiments, and as illustrated in FIG. 3B, each destination column 120 is assigned a row of similarity matrix 312. For example, destination column x is assigned first row 314a of similarity matrix 312, and destination column y is assigned second row 314b of similarity matrix 312. Similarly, each source column 114 of first database 110 is assigned a column 316 of columns 316a through 316q of similarity matrix 312. Each entry of similarity matrix 312, located at the intersection of a row 314 and a column 316, corresponds to the similarity index 310 calculated between the destination column 120 corresponding to row 314 and the source column 114 corresponding to column 316. In some embodiments, rather than assigning destination columns 120 to rows of similarity matrix 312 and source columns 114 to columns of similarity matrix 312, database tool 102 assigns destination columns 120 to columns of similarity matrix 312 and source columns 114 to rows of similarity matrix 312.

Database tool 102 uses similarity matrix 312 to identify those portions of the schema of first database 110 that are relevant to instruction 136. For example, in certain embodiments, database tool 102 determines those columns 114 of first database 110 that are relevant to instruction 136 by identifying those entries of similarity matrix 312 that are greater than a threshold. The threshold may be set at any suitable value. As an example, the threshold may be set at 0.75. As illustrated in FIG. 3B, first database 110 includes three columns 114 that are associated with similarity indices 310 that are greater than 0.75—column 114b (corresponding to column 316b of similarity matrix 312), column 114g (corresponding to column 316g of similarity matrix 312), and column 114h (corresponding to column 316h of similarity matrix 312).

Database tool 102 uses the columns 114 of first database 110 that it has identified, using similarity matrix 312, as relevant to instruction 136 to generate pruned graphical representation 128 from graphical representation 126. FIG. 3C presents an example pruned graphical representation 128 generated using the similarity matrix 312 presented in FIG. 3B. As illustrated in FIG. 3C, pruned graphical representation 128 includes nodes 204b, 204g, and 204h, corresponding, respectively, to source columns 114b, 114h, and 114g, which database tool 102 identified as relevant to instruction 136. Pruned graphical representation 128 also includes nodes 202a and 202b, corresponding, respectively, to tables 112a and 112b, which each hold one or more of the source columns 114 that database tool 102 identified as relevant to instruction 136. Additionally, pruned graphical representation 128 includes nodes 204a and 204e, corresponding, respectively, to primary key column 114a and foreign key column 114e of a primary key-foreign key pair linking table 112a to table 112b. Knowledge of the primary key-foreign key relationship between table 112a and table 112b will be useful for database tool 102 when joining data stored in table 112a and data stored in table 112b into a single table 118 stored in second database 116.

IV. Translation from Plain Text Instructions to Executable Code

Figure 4:
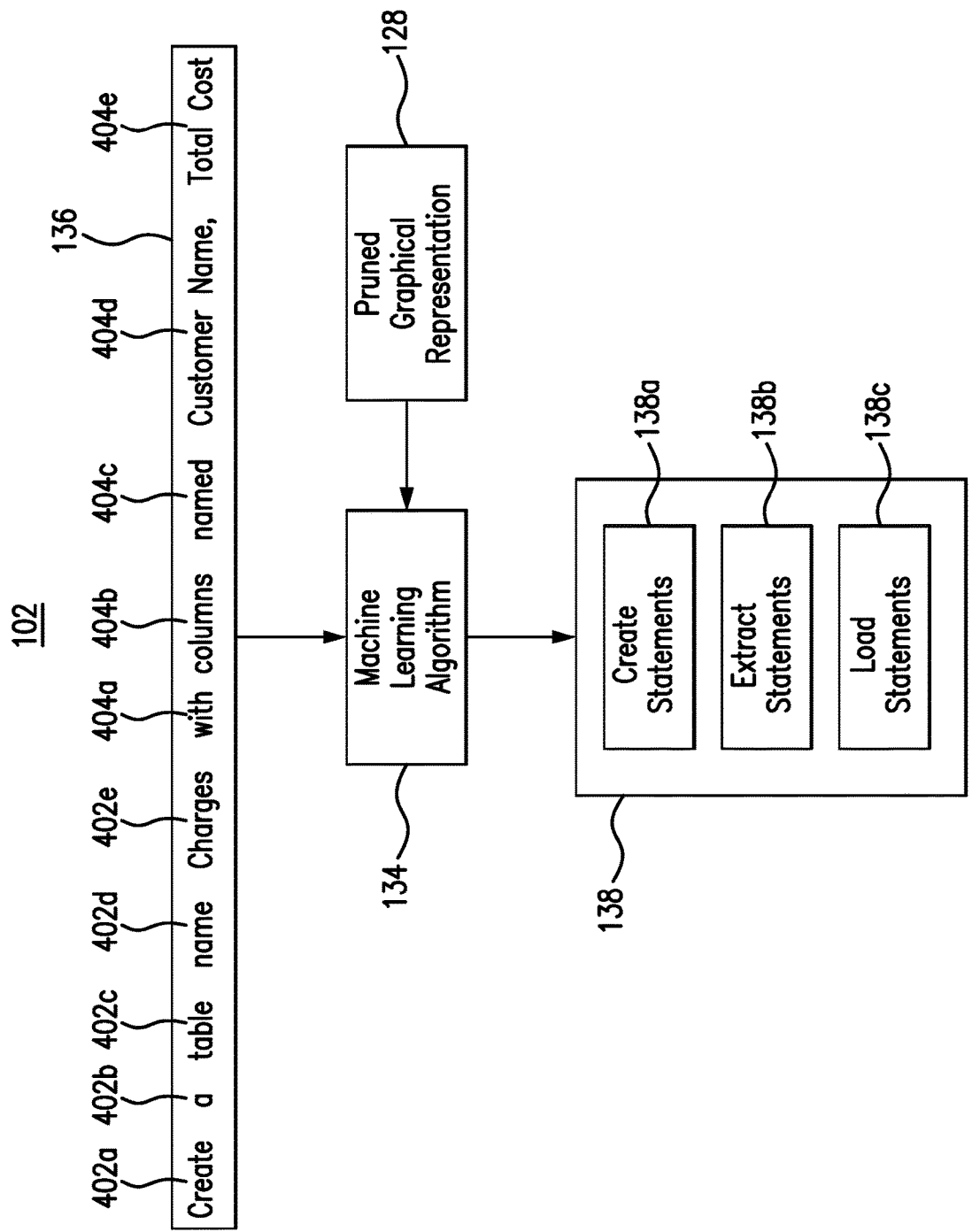
FIG. 4 illustrates an example of the process by which the database tool of FIG. 1 converts an instruction to populate certain columns of a destination relational database with data extracted from a source relational database into executable program code.

Database tool 102 uses pruned graphical representation 128, along with machine learning algorithm 134, to convert instruction 136 into script 138 of executable program code that is configured, when executed, to extract data from first database 110 and use the extracted data to populate the columns 120 of second database 116 that are specified in instruction 136. FIG. 4 illustrates an example of the process by which database tool 102 uses machine learning algorithm 134 and pruned graphical representation 128 to convert instruction 136 into script 138.

As illustrated in FIG. 4, instruction 136 includes a set of words 402a through 402e associated with an action to be performed on second database 116. While the action illustrated in FIG. 4 is to "create a table named Charges," instruction 136 may include any suitable instruction. For example, instruction 136 may include an instruction to update an existing table 118 in second database 116. As illustrated in FIG. 4, instruction 136 also includes a set of words 404a through 404e specifying the names of specific columns 120 in second database 116 which are to be populated with data (in this example, columns named "CustomerName," and "TotalCost"). Machine learning algorithm 134 is configured to parse instruction 136 and to identify those words 402a through 402e that are associated with actions and those words 404a through 404e identifying destination columns 120.

The words 402a through 402e that are associated with actions are generally independent of the schema of first database 110. Accordingly, machine learning algorithm 134 is configured to convert these words directly into executable code statements. For example, machine learning algorithm 134 is configured to convert words 402a through 402e, instructing database tool 102 to "create a table named Charges," into a set of create statements 138a of script 138. Note, however, that in certain embodiments, database tool 102 may not completely specify the executable code statements 138a related to action words 402a through 402e until after consulting with pruned graphical representation 128 to identify the data from first database 110 that is to be used to populate the destination columns 120 specified by words 404a through 404e. For example, prior to consulting pruned graphical representation 128, machine learning algorithm 134 may generate the following partial executable statement from words 402a through 402e, instructing database tool 102 to "create a table named Charges":

CREATE TABLE Charges (
CustomerName
TotalCost
);

This executable statement is missing the datatypes that should be assigned to columns CustomerName and Total-Cost. After consulting pruned graphical representation 128 and determining that the CustomerName column is to be populated with data of the character datatype, and that the TotalCost column is to be populated with data of the double datatype, machine learning algorithm 134 may complete the partial executable statement from above as follows:

CREATE TABLE Charges (
CustomerName varchar(255),
TotalCost double(10, 2)
);

On the other hand, the words 404a through 404e that identify destination columns 120 are related to the schema of first database 110, in the sense that data from first database 110 is to be used to populate the identified destination columns 120. Accordingly, machine learning algorithm 134 is configured to use pruned graphical representation 128 to convert these words into (1) a set of executable statements 138b configured, when executed, to extract data from the columns 114 of first database 110 that are identified in pruned graphical representation 128, and (2) a set of executable statements 138c configured, when executed, to load the extracted data (or other data derived from the extracted data) into the identified destination columns 120 of second database 116. Machine learning algorithm 134 may be configured to use pruned graphical representation 128 to generate executable statements 128 in any suitable manner. For example, machine learning algorithm 134 may be configured to decompose pruned graphical representation 128 into a series of SELECT SQL statements to be executed on first database 110.

In certain embodiments, instruction 136 may include a list of destination columns 120 and no action words. In such embodiments, database tool 102 may scan second database 116 to determine whether or not the listed destination columns 120 already exist within second database 116. If the listed destination columns 120 already exist within second database 116, database tool 102 assumes that it is to update the contents of the listed destination columns 120. If the listed destination columns 120 do not already exist within second database 116, database tool 102 assumes that it is to create the listed destination columns 120 within second database 116.

In certain embodiments, the destination columns 120 identified in instruction 136 may correspond one-to-one with a set of source columns 114 identified in pruned graphical representation 128. In such embodiments, machine learning algorithm 134 may generate executable code 138 configured, when executed, to extract data from a given source column 114 and load the extracted data into a corresponding destination column 120. In some embodiments, the destination columns 120 identified in instruction 136 may not correspond one-to-one with a set of source columns 114 identified in pruned graphical representation 128. For example, a destination column 120 named "TotalCost," may be related to a pair of source columns 114 identified in pruned graphical representation 128 and named "Price," and "Tax," based on an association between the name "Total-Cost," and the terms "Price" and "Tax" presented in lexicon 130. For instance, lexicon 130 may indicate that "Total Cost is equal to Price plus Tax." Accordingly, machine learning algorithm 134 may be configured to determine the relationship between multiple source columns 114 identified in pruned graphical representation 128 and a specified destination column 120, and generate executable code statements to convert data from the multiple source columns into data for the specified destination columns. For example, machine learning algorithm 134 may generate executable code statements 138 configured, when executed, to (1) extract first data from a source column 114g named "Price," (2) extract second data from a source columns 114h named "Tax," (3) add the first data and the second data together to form third data, and (4) load the fourth data into a columns 120b of second database 116 named "TotalCost."

When converting instruction 136 into executable statements 138, the context of each word included in instruction 136 is important; machine learning algorithm 134 should not consider each word of instruction 136 independently of the others. For example, even though the phrases "create table update" and "update table create" include the same three words, the first phrase is an instruction to create a table within second database 116 with the name update, while the second phrase is an instruction to update an already existing table in second database 116 named create. Accordingly, machine learning algorithm 134 should convert these two phrases into different sets of executable statements. As another example, machine learning algorithm 134 should generate the same set of executable statements regardless of whether instruction 136 is presented in active or passive form. For instance a first instruction 136 which includes the phrase "create a table named Customer with columns customer ID, customer name, and customer address," should lead to the same set of executable statements 138 as a second instruction 136 with includes the phrase "a table named Customer with columns customer ID, customer name, and customer address should be created." Because the context of the words that are included in instruction 136 is important, machine learning algorithm 134 should be an algorithm that considers each word of instruction 136 in relation to the other words of instruction 136. For example, in certain embodiments, machine learning algorithm 134 is a long short-term memory neural network.

Figure 5A:
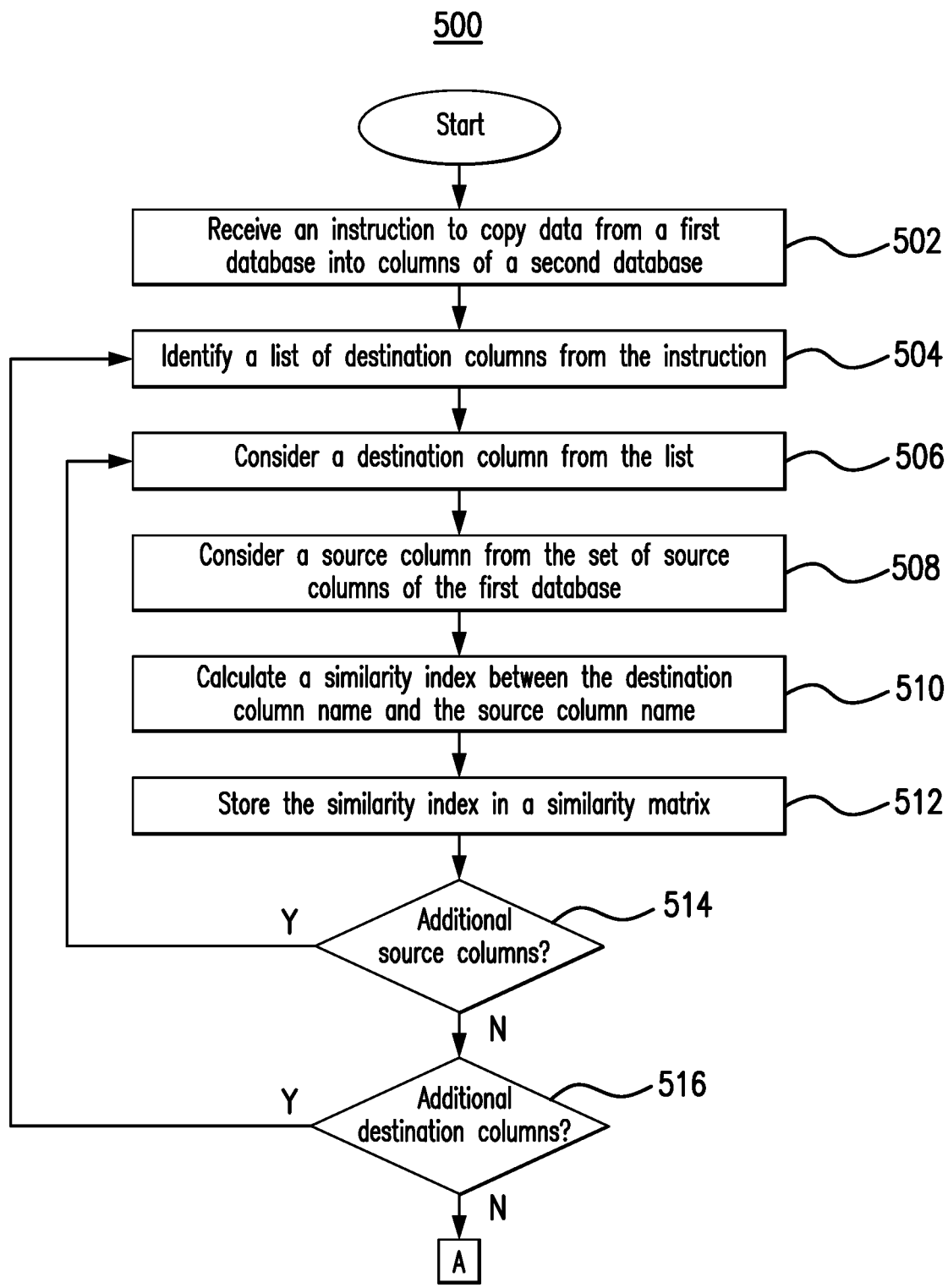
FIGS. 5A and 5B present a flowchart illustrating the process by which the database management tool presented in FIG. 1 generates and executes a script to transfer data from a source relational database into a destination relational database.
Figure 5B:
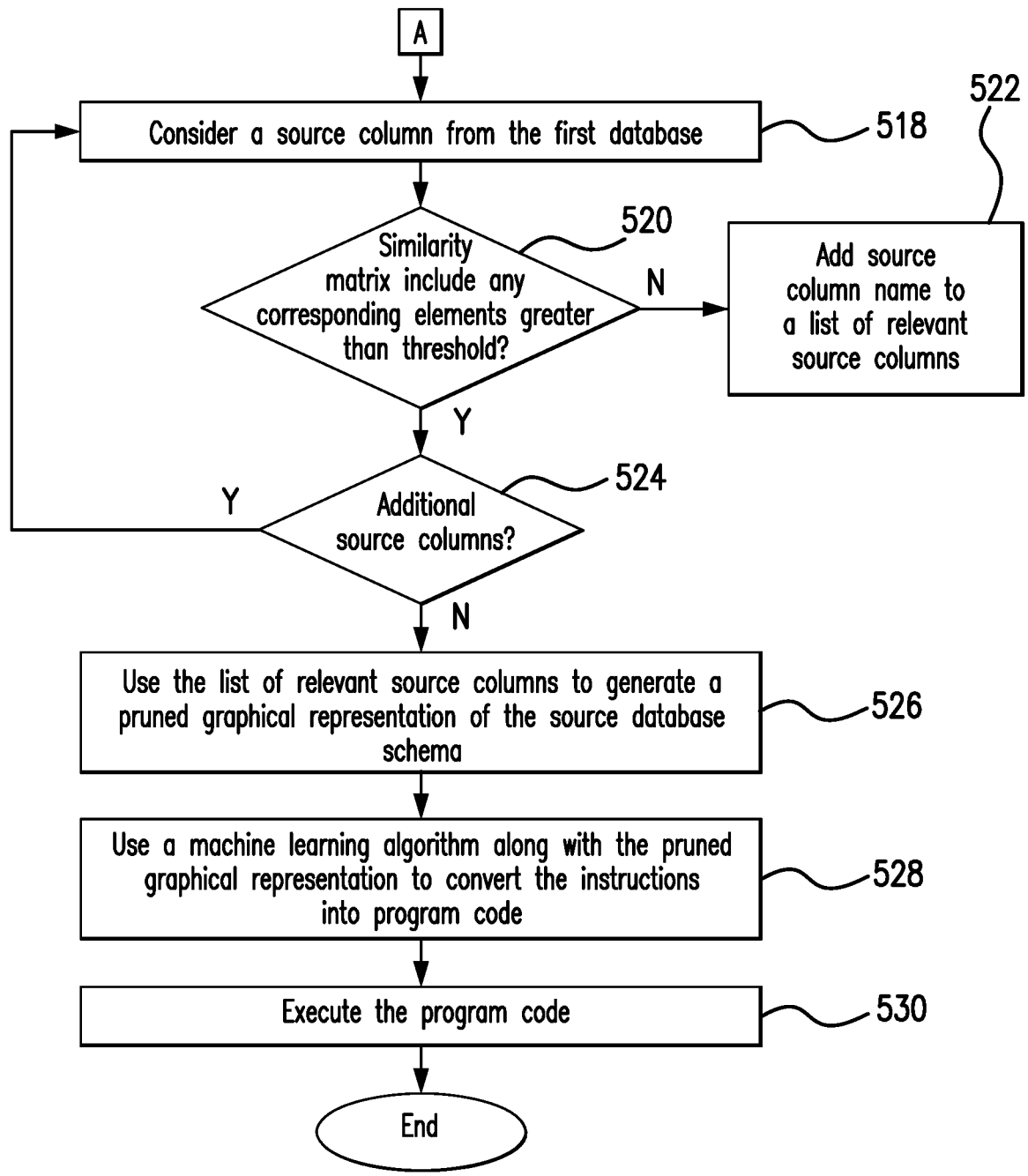

V. Method of Transferring Data from a Source Database into a Destination Database FIGS. 5A and 5B present a flowchart illustrating an example method 500 by which database tool 102 generates and executes database script 138, to transfer data from first database 110 to second database 116. In step 502 database tool 102 receives an instruction 136 to transfer data from first database 110 into specified columns 120 of second database 116 (destination columns). Destination columns 120 may or may not already exist within second database 116. In step 504 database tool 102 parses instruction 136 to identify a list of the names 302 of the destination columns 120. In step 506 database tool 102 considers a name 302 from the list of names 302 of destination columns 120. In step 508 database tool 102 considers a name 301 from the set of names 301 of source columns 114 of first database 110. In step 510 database tool 102 calculates a similarity index 310 between name 302 of destination column 120 and name 301 of source column 114 (or a similarity index 310 between name 302 of destination columns 120 and a term associated with name 301 of source column 114, as indicated by lexicon 130). In step 512 database tool 102 stores similarity index 310 as an entry in similarity matrix 312.

In step 514 database tool 102 determines whether any additional source columns 114 exist in first database 110. If, in step 514 database tool 102 determines that additional source columns 114 exist in first database 110, method 500 returns to step 508. If, in step 514 database tool 102 determines that no additional source columns 114 exist in first database 110, in step 516 database tool 102 determines whether any additional destination columns 120 are specified in instruction 136. If, in step 516 database tool determines that additional destination columns 120 are specified in instruction 136, method 500 returns to step 506. If, in step 516 database tool 102 determines that no additional destination columns 120 are specified in instruction 136, method 500 proceeds to step 518.

In step 518 database tool 102 considers a source column 114, corresponding to a source column name 301, from first database 114. In step 520 database tool 102 determines whether similarity matrix 312 includes any elements associated with source column 114 that are greater than a threshold. If, in step 520 database tool 102 determines that similarity matrix 312 does include one or more elements associated with source column 114 that are greater than the threshold, in step 522 database tool 102 stores a record of source column 114 in a list of relevant source columns 114. If, in step 520 database tool 102 determines that similarity matrix 312 does not include any elements associated with source column 114 that are greater than the threshold, in step 524 database tool 102 determines whether or not first database 110 includes any additional source columns 120. If, in step 524 database tool 102 determines that first database 110 includes additional source columns 120, method 500 returns to step 518. If, in step 524 database tool 102 determines that first database 110 does not include any additional source columns 120, method 500 proceeds to step 526.

In step 526 database tool 102 uses the list of relevant source columns 114 to generate pruned graphical representation 128 from graphical representation 126. In step 528 database tool 102 applies machine learning algorithm 134 to instruction 136. Machine learning algorithm 134 is trained to parse instruction 136 and convert it into a set of executable code statements 138, with the help of pruned graphical representation 128. For example, in certain embodiments, machine learning algorithm 134 converts pruned graphical representation 128 into a series of SELECT SQL statements. Finally, in step 530 database tool 102 executes code statements 138 to populate the destination columns 120 of second database 116, specified in instruction 136, with data from first database 110.

Modifications, additions, or omissions may be made to method 500 depicted in FIGS. 5A and 5B. Method 500 may include more, fewer, or other steps. For example, steps may be performed in parallel or in any suitable order. While discussed as database tool 102 (or components thereof) performing the steps, any suitable component of system 100, such as device(s) 106 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
a first database configured to store data according to a schema, the first database comprising a set of source tables and a set of source columns, each table of the set of source tables comprising a subset of columns of the set of source columns, each column of the set of source columns assigned a source column name of a set of source column names;
a second database;
a memory configured to store:
a graphical representation of the schema of the first database, the graphical representation comprising:
a set of nodes, each node of the set of nodes corresponding to at least one of:
a table of the set of source tables of the first database; and
a column of the set of source columns of the first database; and
a set of connections, wherein each connection of the set of connections is between a pair of nodes of the set of nodes and indicates a relationship between the pair of nodes;
a lexicon comprising a set of terms, each term of the set of terms associated with a source column name of the set of source column names;
a hardware processor communicatively coupled to the memory, the hardware processor configured to:
receive an instruction to transfer data from the first database to the second database, the instruction comprising a list of destination column names, wherein each destination column name of the list of destination column names specifies a column of a set of destination columns of the second database into which a portion of data from the first database is to be transferred;
in response to receiving the instruction:
identify the list of destination column names from the instruction;
generate, using the set of source column names and the list of destination column names, a similarity matrix comprising a set of similarity scores, wherein:
the set of source column names corresponds to a first dimension of the similarity matrix;
the list of destination column names corresponds to a second dimension of the similarity matrix; and
each similarity score of the set of similarity scores corresponds to a specific source column name of the set of source column names and a specific destination column name of the list of destination column names, and indicates a degree of similarity between the specific destination column name and at least one of:
the specific source column name; and
a term of the set of terms of the lexicon associated with the specific source column name;
identify, using the similarity matrix, a subset of source columns, wherein for each source column of the subset of source columns, there exists a similarity score of the set of similarity scores corresponding to a source column name assigned to the source column, which is greater than a threshold;
generate, from the graphical representation of the schema of the first database and using the subset of source columns, a pruned graphical representation comprising a subset of nodes of the set of nodes, wherein each node of the subset of nodes is associated with a column of the subset of source columns;

generate, using the instruction and the pruned graphical representation, executable program code configured, when executed, to select data from the first database and insert the data into the second database, wherein:
the data is selected from locations in the first database specified by the subset of nodes of the pruned graphical representation; and
the data is inserted into locations in the second database specified by the list of destination column names; and
execute the executable program code.

2. The system of claim 1, wherein:
the instruction comprises an instruction to create a table in the second database, the table comprising the destination columns specified by the list of destination column names; and
the executable program code comprises code configured, when executed, to create the table in the second database.

3. The system of claim 1, wherein the instruction comprises an instruction to update the destination columns specified by the list of destination column names, in an existing table in the second database.

4. The system of claim 1, wherein the executable program code comprises SQL statements.

5. The system of claim 1, wherein generating the executable program code comprises applying a machine learning algorithm to the instructions, the machine learning algorithm configured to convert the instructions into an ordered list of executable program code statements.

6. The system of claim 5, wherein the machine learning algorithm is a long short-term memory algorithm.

7. The system of claim 1, wherein generating a similarity score of the set of similarity scores that corresponds to a specific source column name of the set of source column names and a specific destination column name of the list of destination column names comprises:
splitting the specific destination column name into a first set of features;
splitting the specific source column name into a second set of features;
forming a first vector from the first set of features;
forming a second vector from the second set of features; and
computing the similarity score based on a dot product between the first vector and the second vector.

8. A method comprising:
receiving an instruction to transfer data from a first database to a second database, wherein:
the instruction comprises a list of destination column names, each destination column name of the list of destination column names specifying a column of a set of destination columns of the second database; and
the first database comprises a set of source tables and a set of source columns, each table of the set of source tables comprising a subset of columns of the set of source columns, each column of the set of source columns assigned a source column name of a set of source column names;
in response to receiving the instruction:
identifying the list of destination column names from the instruction;
identifying a subset of source columns of the set of source columns such that, for each source column of the subset of source columns a similarity score associated with the source column is greater than a threshold, wherein:
a specific source column name of the set of source column names is assigned to the source column of the subset of source columns; and
the similarity score is calculated with respect to a specific destination column name of the list of destination column names, and indicates a degree of similarity between the specific destination column name and at least one of:
the specific source column name; and
a term associated with the specific source column name, the term stored in a lexicon;
generating, from a graphical representation of a schema of the first database and using the subset of source columns, a pruned graphical representation, wherein:
the graphical representation of the schema of the first database comprises:
a set of nodes, each node of the set of nodes corresponding to at least one of:
a table of a set of source tables of the first database; and
a column of a set of source columns of the first database; and
a set of connections, wherein each connection of the set of connections is between a pair of nodes of the set of nodes and indicates a relationship between the pair of nodes; and
the pruned graphical representation comprises a subset of nodes of the set of nodes, each node of the subset of nodes associated with a column of the subset of source columns; and
generating, using the instruction and the pruned graphical representation, executable program code configured, when executed, to select data from locations in the first database and insert the data into the second database, the locations determined from the subset of nodes of the pruned graphical representation.

9. The method of claim 8, wherein:
the instruction comprises an instruction to create a table in the second database, the table comprising the destination columns specified by the list of destination column names; and
the executable program code comprises code configured, when executed, to create the table in the second database.

10. The method of claim 8, wherein the instruction comprises an instruction to update the destination columns specified by the list of destination column names, in an existing table in the second database.

11. The method of claim 8, wherein the executable program code comprises SQL statements.

12. The method of claim 8, wherein generating the executable program code comprises applying a machine learning algorithm to the instructions, the machine learning algorithm configured to convert the instructions into an ordered list of executable program code statements.

13. The method of claim 12, wherein the machine learning algorithm is a long short-term memory algorithm.

14. The method of claim 8, wherein generating a similarity score of the set of similarity scores that corresponds to a specific source column name of the set of source column names and a specific destination column name of the list of destination column names comprises:
splitting the specific destination column name into a first set of features;

splitting the specific source column name into a second set of features;

forming a first vector from the first set of features;

forming a second vector from the second set of features; and computing the similarity score based on a dot product between the first vector and the second vector.

15. An apparatus comprising:

a memory configured to store:

a graphical representation of a schema of a first database, the first database comprising a set of source tables and a set of source columns, each table of the set of source tables comprising a subset of columns of the set of source columns, each column of the set of source columns assigned a source column name of a set of source column names, the graphical representation comprising:

a set of nodes, each node of the set of nodes corresponding to at least one of:

a table of a set of source tables of the first database; and a column of a set of source columns of the first database; and a set of connections, wherein each connection of the set of connections is between a pair of nodes of the set of nodes and indicates a relationship between the pair of nodes;

a lexicon comprising a set of terms, each term of the set of terms associated with a source column name of the set of source column names;

a hardware processor communicatively coupled to the memory, the hardware processor configured to:

receive an instruction to transfer data from the first database to a second database, the instruction comprising a list of destination column names, wherein each destination column name of the list of destination column names specifies a column of a set of destination columns of the second database;

in response to receiving the instruction:

identify the list of destination column names from the instruction;

identify a subset of source columns of the set of source columns such that, for each source column of the subset of source columns a similarity score associated with the source column is greater than a threshold, wherein:

a specific source column name of the set of source column names is assigned to the source column of the subset of source columns; and the similarity score is calculated with respect to a specific destination column name of the list of destination column names, and indicates a degree of similarity between the specific destination column name and at least one of:

the specific source column name; and a term of the set of terms of the lexicon associated with the specific source column name;

generate, from the graphical representation of the schema of the first database and using the subset of source columns, a pruned graphical representation comprising a subset of nodes of the set of nodes, wherein each node of the subset of nodes is associated with a column of the subset of source columns; and generate, using the instruction and the pruned graphical representation, executable program code configured, when executed, to select data from locations in the first database and insert the data into the second database, the locations determined from the subset of nodes of the pruned graphical representation.

16. The apparatus of claim 15, wherein:

the instruction comprises an instruction to create a table in the second database, the table comprising the destination columns specified by the list of destination column names; and the executable program code comprises code configured, when executed, to create the table in the second database.

17. The apparatus of claim 15, wherein the instruction comprises an instruction to update the destination columns specified by the list of destination column names, in an existing table in the second database.

18. The apparatus of claim 15, wherein the executable program code comprises SQL statements.

19. The apparatus of claim 15, wherein generating the executable program code comprises applying a long short-term memory machine learning algorithm to the instructions, the machine learning algorithm configured to convert the instructions into an ordered list of executable program code statements.

20. The apparatus of claim 15, wherein generating the similarity score comprises:

splitting the specific destination column name into a first set of features;

splitting the specific source column name into a second set of features;

forming a first vector from the first set of features;

forming a second vector from the second set of features; and computing the similarity score based on a dot product between the first vector and the second vector.

* * * * *